United States Patent
Kim et al.

(10) Patent No.: US 9,721,500 B2
(45) Date of Patent: Aug. 1, 2017

(54) DISPLAY DEVICE HAVING TOUCH SCREEN

(71) Applicant: LG DISPLAY CO., LTD., Seoul (KR)

(72) Inventors: Seunghyun Kim, Goyang-si (KR); Howon Choi, Paju-si (KR); Jinyeol Kim, Sangju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/473,208

(22) Filed: Aug. 29, 2014

(65) Prior Publication Data
US 2015/0062101 A1 Mar. 5, 2015

(30) Foreign Application Priority Data

Sep. 3, 2013 (KR) .................. 10-2013-0105261

(51) Int. Cl.
*G09G 3/32* (2016.01)
*G09G 3/3233* (2016.01)
*G06F 3/041* (2006.01)
*G06F 3/044* (2006.01)

(52) U.S. Cl.
CPC .......... *G09G 3/3233* (2013.01); *G06F 3/044* (2013.01); *G06F 3/0416* (2013.01); *G06F 2203/04103* (2013.01)

(58) Field of Classification Search
CPC ........ G06F 3/041; G06F 3/044; G06F 3/0416; G09G 5/00; G09G 3/30; G09G 3/3208; G09G 3/3233; H01L 51/50; H01L 51/524; H01L 51/5243; H01L 51/5246; H01L 51/525; H01L 51/56
See application file for complete search history.

(56) References Cited

U.S. PATENT DOCUMENTS

| 8,847,893 B2* | 9/2014 | Park | G06F 3/044 345/156 |
|---|---|---|---|
| 2010/0182253 A1 | 7/2010 | Park et al. | |
| 2011/0316802 A1* | 12/2011 | Choi | G06F 3/041 345/173 |
| 2013/0147727 A1* | 6/2013 | Lee | G06F 3/0412 345/173 |

FOREIGN PATENT DOCUMENTS

CN 101626017 A 1/2010

OTHER PUBLICATIONS

Office Action dated Dec. 1, 2016 for Chinese Application No. 201410372905.1, 14 pages.

\* cited by examiner

*Primary Examiner* — Jennifer Mehmood
*Assistant Examiner* — Sardis F Azongha
(74) *Attorney, Agent, or Firm* — Brinks Gilson & Lione

(57) ABSTRACT

A display device comprises: a pixel array substrate comprising first pads; a touch screen substrate comprising second pads; an adhesive film that attaches the pixel array substrate and the touch screen substrate; and a conductive sealant that electrically connects the first pads and the second pads between the pixel array substrate and the touch screen substrate. The adhesive film comprises: an opening with the conductive sealant applied thereto; and an extension portion that surrounds the opening.

8 Claims, 13 Drawing Sheets

DISPLAY DEVICE HAVING TOUCH SCREEN

This application claims the benefit of priority to Korea Patent Application No. 10-2013-0105261 filed on Sep. 3, 2013, which is incorporated herein by reference for all purposes as if fully set forth herein.

BACKGROUND

Field

This document relates to a display device having a touch screen.

Related Art

A user interface (UI) is typically configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to include touch UI, voice recognition UI, 3D UI, etc. The touch UI has been necessarily used in portable information appliances. The touch UI has been implemented by a method for forming a touch screen on the screen of a display device. Touch sensors of the touch screen may be embedded in a display panel.

As an example of the method of embedding the touch sensors of the touch screen, the touch screen may be formed on a touch screen substrate, and then a pixel array substrate and the touch screen substrate may be bonded together so that the pixel array substrate and the touch screen substrate face each other. A touch screen drive circuit may be connected to the pixel array substrate to drive the touch screen and receive touch sensor signals through lines on the touch screen. In the bonding process, line terminals (or upper pads) formed on the touch screen may be attached to touch screen line terminals (or lower pads) formed on the pixel array substrate by a conductive sealant. By the way, when the bonding process is performed in a vacuum chamber, the conductive sealant may be scattered due to a large pressure difference between the inside and outside of the display panel. This causes the conductive sealant to move, resulting in a bad electrical contact between the line terminals of the two substrates.

SUMMARY

A display device comprises: a pixel array substrate comprising first pads; a touch screen substrate comprising second pads; an adhesive film that attaches the pixel array substrate and the touch screen substrate; and a conductive sealant that electrically connects the first pads and the second pads between the pixel array substrate and the touch screen substrate.

The adhesive film comprises: an opening with the conductive sealant applied thereto; and an extension portion that surrounds the opening.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Figure 1:
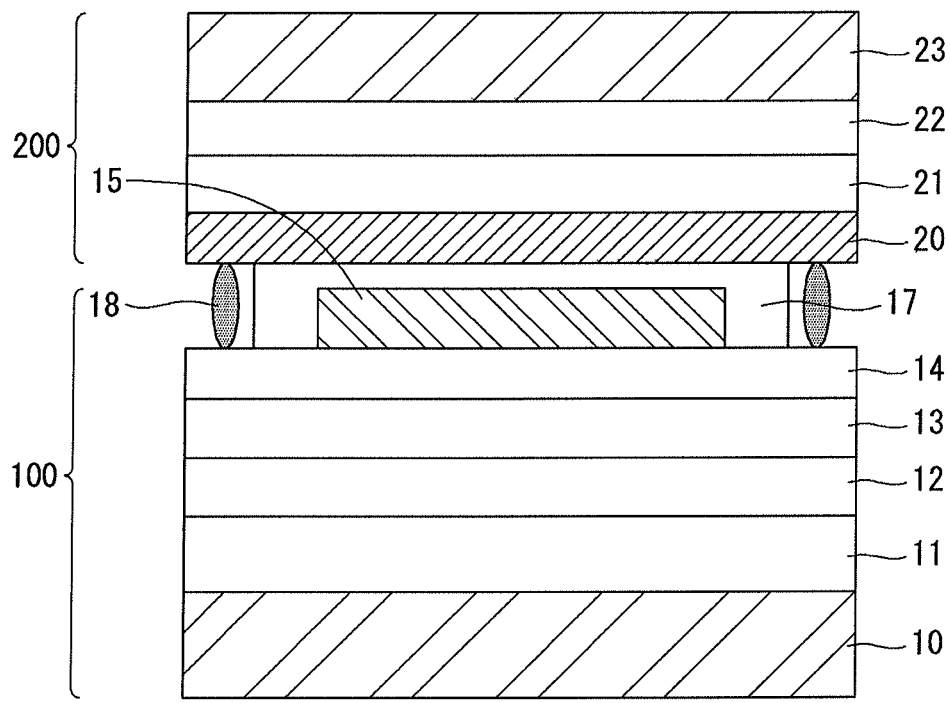
FIG. 1 is a cross-sectional view showing a display device according to an exemplary embodiment of the present invention.

A display device of the present invention may be implemented as a flat panel display device, such as a liquid crystal display (LCD), a field emission display (FED), a plasma display panel (PDP), an organic light emitting diode display (OLED), or an electrophoresis display (EPD). In an exemplary embodiment that follows, it should be noted that, although an organic light emitting diode display will be described as an example of the flat panel display device, the display device of the present invention is not limited to this example.

A touch screen of the present invention may be implemented as a capacitive touch screen that senses touch input through a plurality of capacitive sensors, but the present invention is not limited thereto. The capacitive touch screen comprises a plurality of touch sensors. Each of the touch sensors comprises a capacitance from an equivalent circuit perspective. The capacitance may be divided into a self capacitance and a mutual capacitance. The self capacitance is formed along conductor lines of a single layer formed in one direction. The mutual capacitance is formed between two conductor lines perpendicular to each other.

Hereinafter, an implementation of this document will be described in detail with reference to the attached drawings. Throughout the specification, like reference numerals denote substantially like components. Hereinafter, the detailed description of related known functions or configurations that may unnecessarily obscure the subject matter of the present invention in describing the present invention will be omitted.

Figure 2:
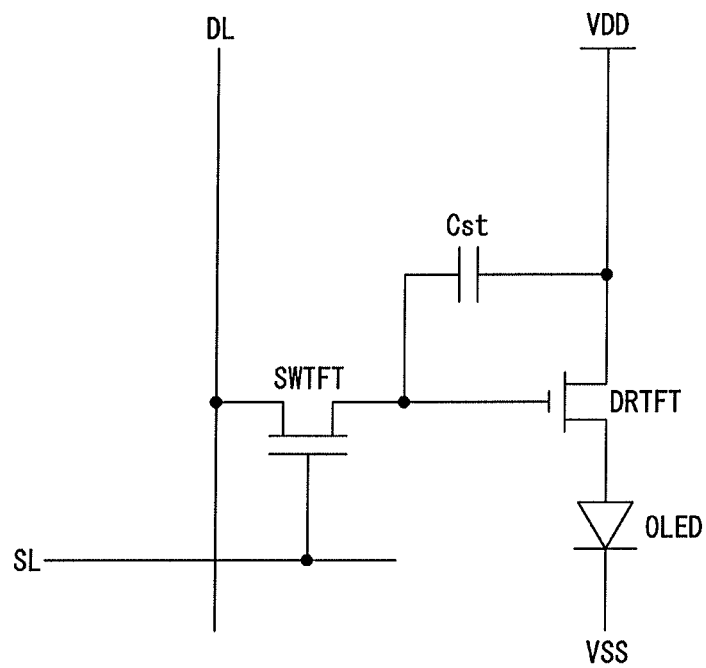
FIG. 2 is an equivalent circuit diagram showing a pixel of an organic light emitting diode display.

Referring to FIGS. 1 and 2, the display device of the present invention comprises a display panel, which is formed by bonding a pixel array substrate 100 and a touch screen substrate 200. The pixel array substrate 100 and the touch screen substrate 200 are attached by an adhesive film 17 and a conductive sealant 18.

The pixel array substrate 100 comprises a first etch stopper layer 12, a first buffer layer 13, a thin film transistor array (hereinafter, 'TFT array') 14, and organic light emitting diode array (hereinafter, 'OLED array') 15 which are stacked on a substrate 10. The substrate 10 may be made from a plastic film substrate, a metal substrate, or a glass substrate where a flexible display can be formed. For the glass substrate, the TFT array 14 may be formed directly on the substrate 10 without the first etch stopper layer 12 or the first buffer layer 13. The first etch stopper layer 12 and the overlying layers may be attached onto the substrate 10 by an adhesive layer 11.

Lines such as data lines, scan lines, a high-potential pixel power supply line VDD, a low-potential pixel power supply line VSS, etc are formed on the TFT array 14. Each of the pixels comprises two or more thin film transistors (hereinafter, 'TFT') DRTFT and SWTFT, and a storage capacitor Cst. The TFT array 14 comprises data pads connected to the data lines, scan pads connected to the scan lines, upper pads PADU (see FIG. 10) of a touch sensor array 20, and lower pads PADL (see FIG. 10) to be contacted with the upper pads PADU.

As shown in FIG. 2, the TFTs of the TFT array 14 comprise a switching TFT SWTFT and a driving TFT DRTFT that are formed at each of the pixels. A capacitor Cst may be connected between the gate of the driving TFT DRTFT and the high-potential pixel power supply line. A compensation circuit (not shown) for compensating the threshold voltage and mobility of the driving TFT DRTFT may be formed at each of the pixels.

The OLED array 15 comprises organic light emitting diodes (hereinafter, 'OLED') connected to the driving TFT DRTF. Each pixel has an OLED. The OLED comprises organic compound layers such as a hole injection layer HIL, a hole transport layer HTL, an emission layer EML, an electron transport layer ETL, and an electron injection layer EIL, which are stacked between an anode and a cathode.

Figure 11:
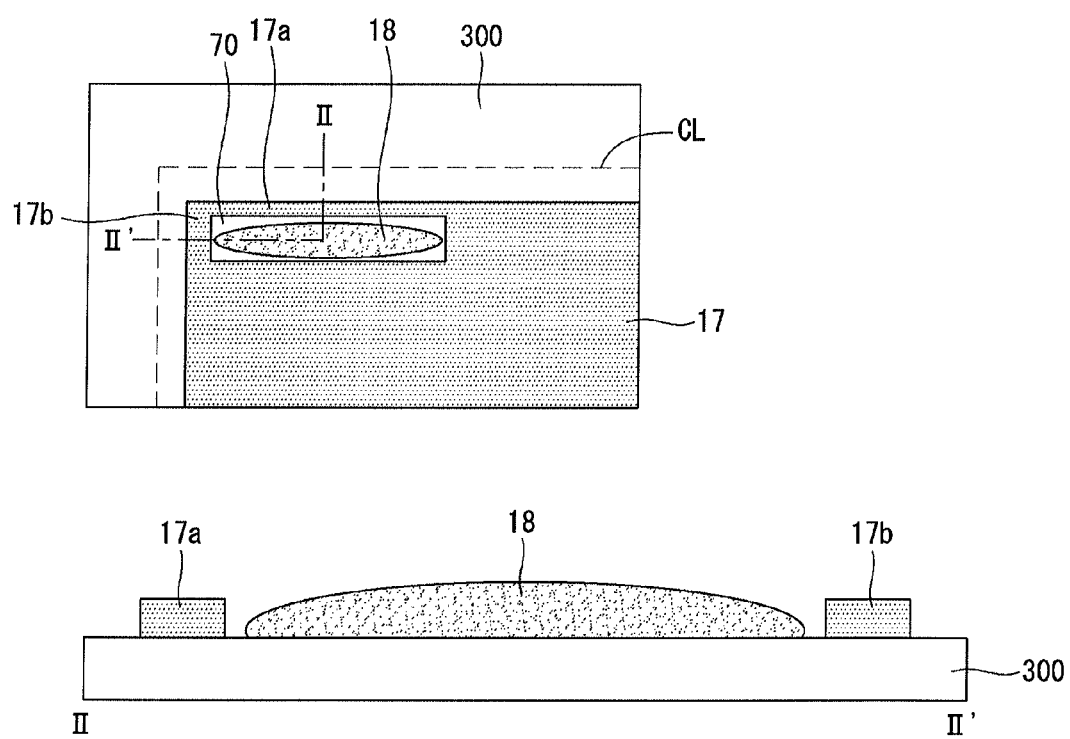
FIG. 11 is a partial enlarged view of a conductive sealant and an adhesive film and a cross-sectional view of an upper plate taken along line II-II'.
Figure 12:
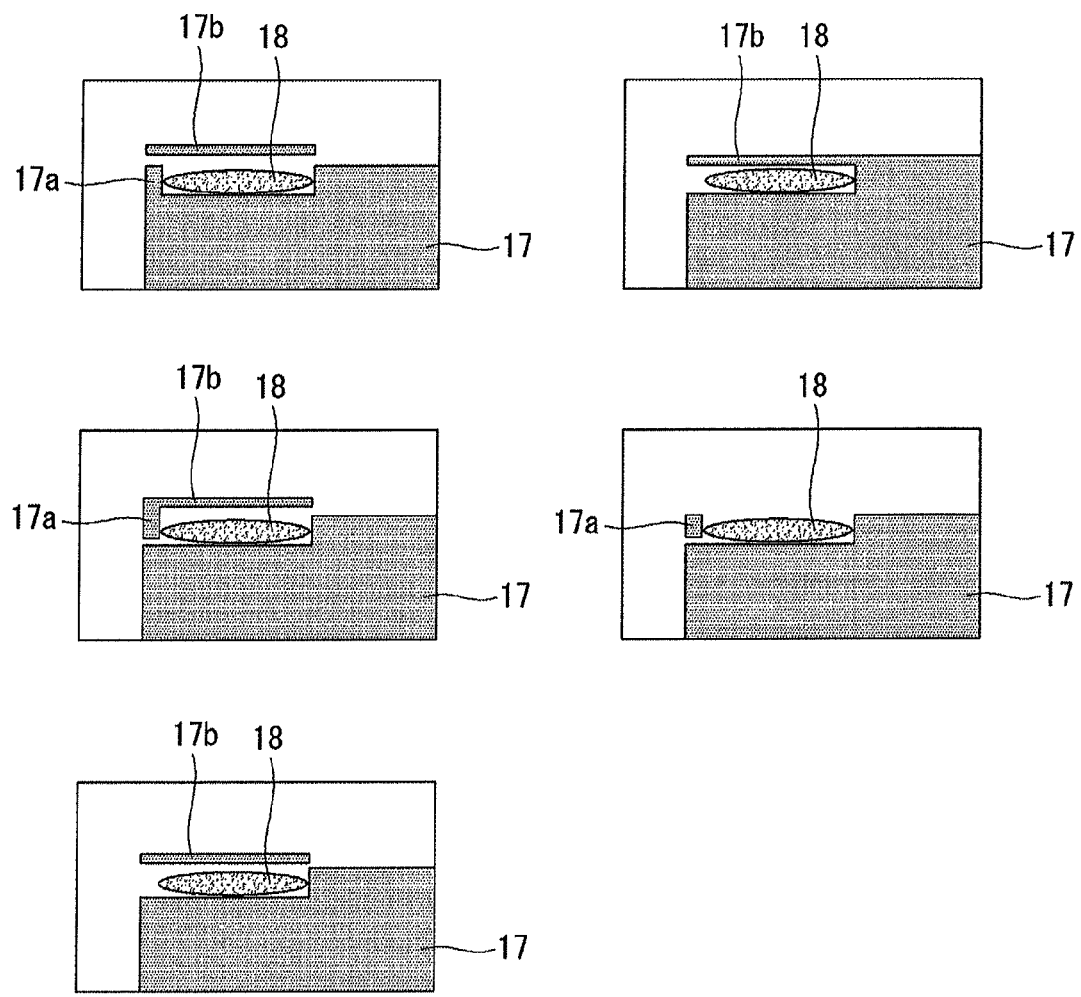
FIG. 12 is a view showing various modifications of extension portions of the adhesive film.

The adhesive film 17 delays the penetration of moisture and oxygen into the OLED array 15, and bonds the pixel array substrate 100 and the touch screen substrate 200 together. As shown in FIGS. 11 and 12, an opening 70 with the conductive sealant 18 applied to it and extension portions 17a and 17b surrounding the opening are formed on one or more of the four corners of the adhesive film 17.

The touch screen substrate 200 comprises a second etch stopper 22, a second buffer layer 21, and a touch sensor array 20 which are stacked on a polarization plate 23. The touch sensor array 20 comprises a plurality of touch sensors, lines (hereinafter, 'TPS lines') that apply a driving signal to the touch sensors and receives output from the touch sensors, and upper pads PADU connected to the TSP lines.

A deposition process, a photolithography process, etc requiring a high-temperature environment may be performed in order to form the TFT array 14 and the OLED array 15 on the substrate 10 and form the touch sensor array 20 on the polarizing plate 23. For a flexible display, a flexible film substrate may be selected as the substrate 10. However, the film substrate or the polarization plate tends to be rolled or deformed during a high-temperature process, making the process unworkable. Accordingly, in a flexible display device of the present invention, buffer layers 13 and 21 and etch stopper layers 12 and 22 are formed on a glass substrate, a TFT array 14, an OLED array 15, and a touch sensor array 20 are formed by depositing a thin film on the glass substrate and patterning it, and then the arrays 14, 15, and 20 are peeled off from the glass substrate.

The etch stopper layers 12 and 22 are used to prevent damage to the arrays 14, 15, and 20 caused by an etching solution or laser irradiation when peeling the arrays 14, 15, and 20 off from the glass substrate after the formation of the arrays 14, 15, and 20. The etch stopper layers 12 and 22 may be formed from an organic insulation film such as polyimide or photo acryl.

The buffer layers 13 and 21 act as a barrier for preventing the penetration of oxygen or moisture into organic films of the OLED. The buffer layers 13 and 21 may be formed by stacking one or more layers of inorganic films, for example, silicon nitride SiNx or silicon oxide SiO2, in a continuous manner or in an alternating manner.

In the flexible display process, the substrate 10 of the pixel array substrate 100 may be attached to the etch stopper layer 12 by peeling the arrays 14 and 15 off from the glass substrate and interposing an adhesive layer 11 between the substrate 10 and the etch stopper layer 12.

In the flexible display process, the polarization plate 23 may be attached to the etch stopper layer 22 by peeling the touch sensor array 20 off from the glass substrate and then interposing an adhesive layer (not shown) between the polarization plate 23 and the etch stopper layer 22, or may be attached directly to the etch stopper layer 22 if the polarization plate 23 has an adhesive surface pre-applied to it. Because the polarization plate 23 covers the touch sensor array 20, it makes the pattern of the touch sensor array invisible when the user sees the polarization plate from outside, and prevents crosstalk caused by external light reflection.

The conductive sealant 18 acts as a conductor that bonds the pixel array substrate 100 and the touch screen substrate 200 together and electrically connects the upper pads PADU of the touch screen substrate 200 and lower pads PADL of the pixel array substrate 100 on a one-to-one basis. The conductive sealant 18 may be implemented as an anisotropic conductive film (ACF) with conductive balls distributed in adhesive resin or anisotropic conductive paste (ACP). The conductive balls may contain silver (Ag) or gold (Au), and may be formed from nanoparticles.

The flexible display process will be described in conjunction with FIGS. 3A to 3E.

Figure 3A:
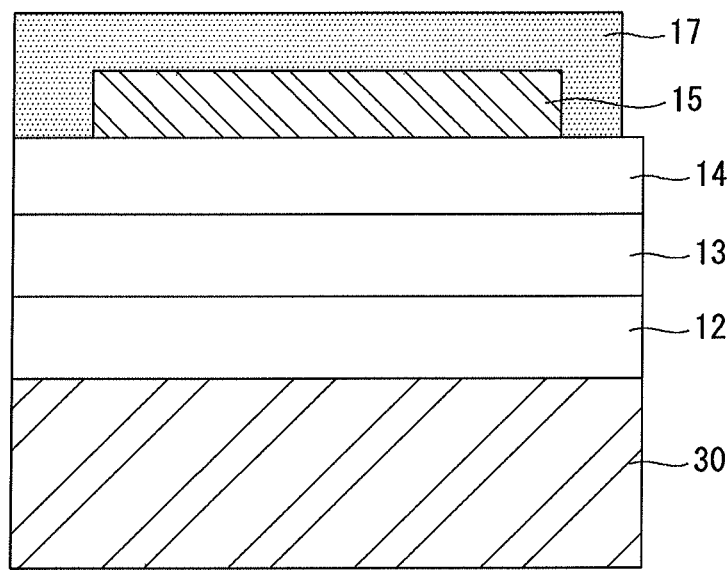
FIGS. 3a to 3e are cross-sectional views showing a flexible display device.

As shown in FIG. 3A, in the flexible display process, a lower plate is manufactured by stacking thin film layers on a first glass substrate 30 in the order of a first etch stopper layer 12, a first buffer layer 13, a TFT array 14, an OLED array 15, and an adhesive film 17.

Figure 3B:
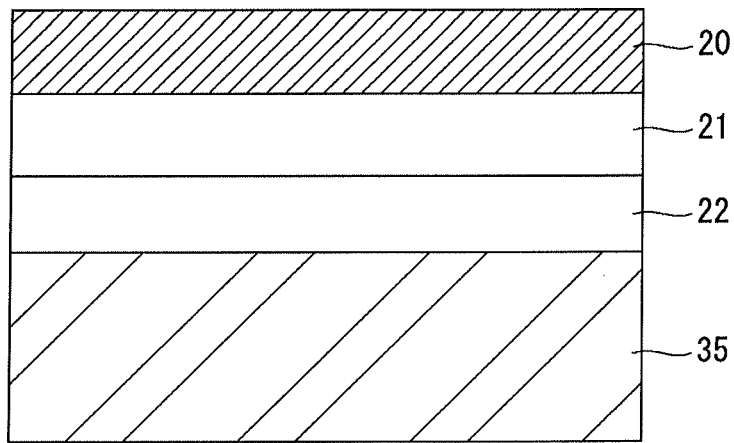

Next, as shown in FIG. 3B, an upper plate is manufactured by stacking thin film layers on a second glass substrate 35 in the order of a second etch stopper layer 22, a second buffer layer 21, and a touch sensor array 20.

Figure 3C:
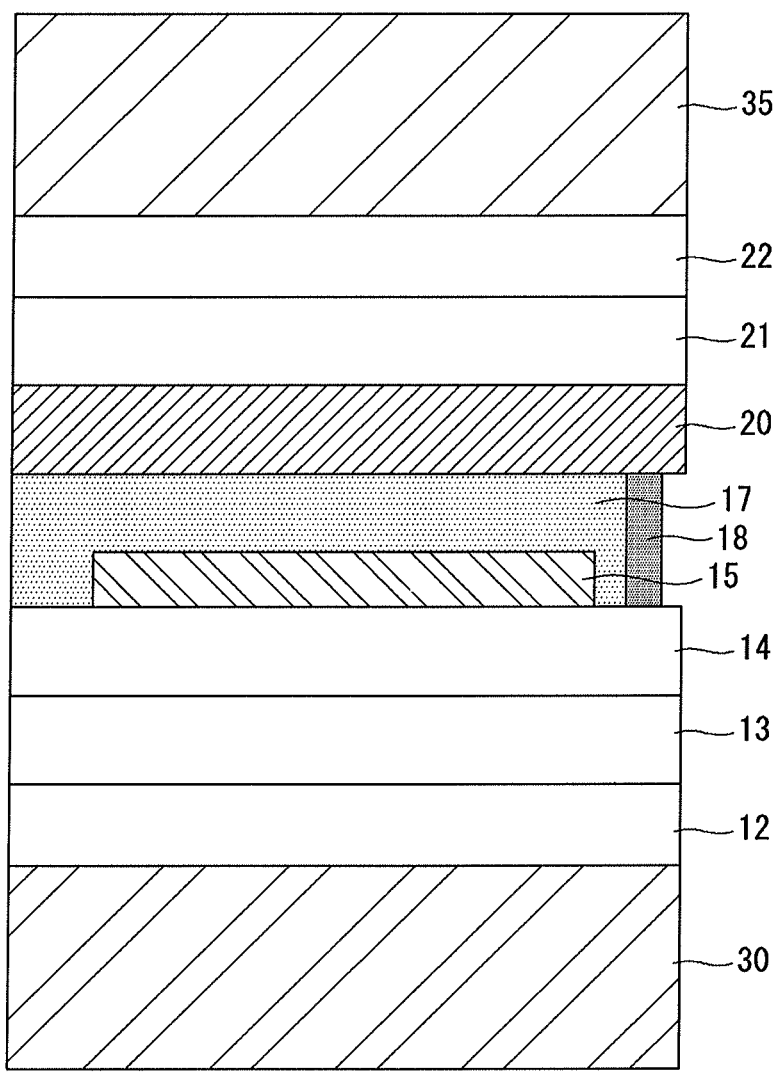

Next, as shown in FIG. 3C, the upper plate and the lower plate are aligned so that the touch sensor array 20 faces the adhesive film 17, and then the upper plate and the lower plate are bonded together by a conductive sealant 18 and the adhesive film 17. In this bonding process, the upper pads PADU and the lower pads PADL are electrically connected, simultaneously with the bonding of the upper and lower plates by the adhesive film 17 and the conductive sealant 18.

Figure 3D:
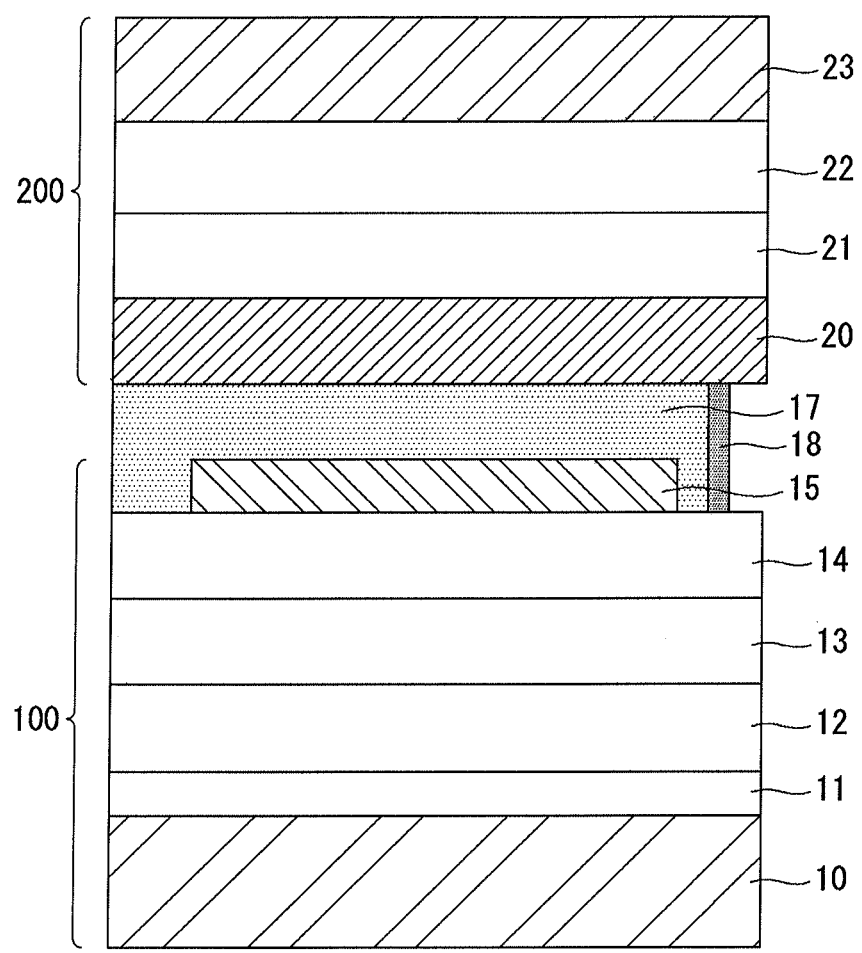
Figure 3E:
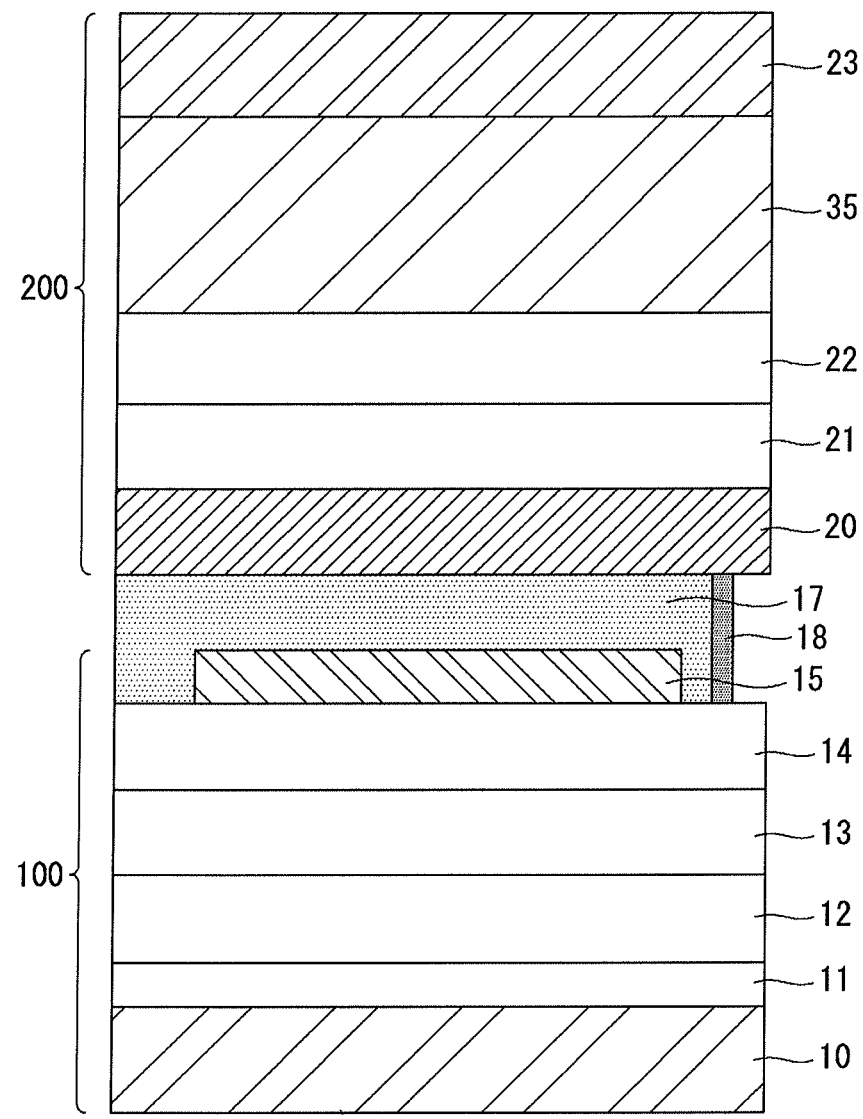
Figure 4:
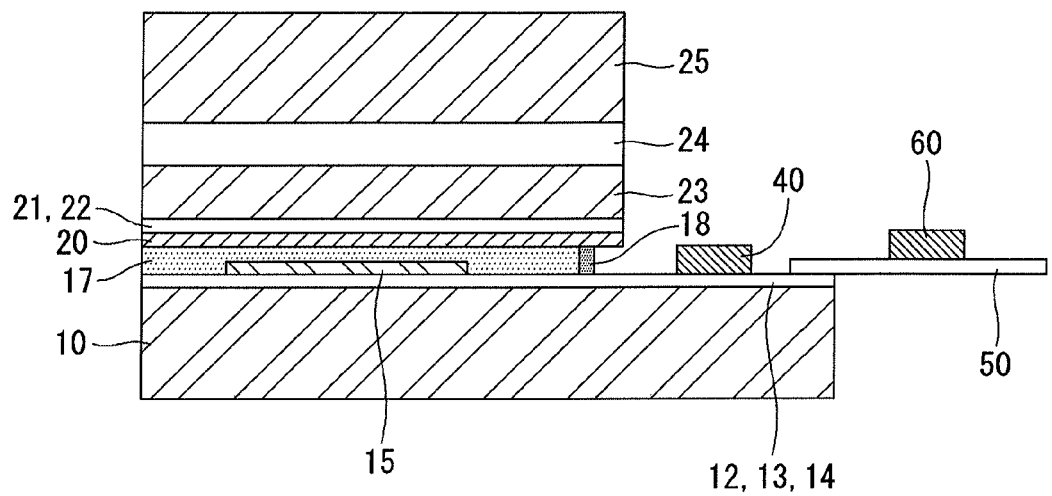
FIGS. 4 and 5 are a side view and a top plan view showing a drive IC in the display device of the present invention.

Next, as shown in FIGS. 3D and 3E, the overlying thin film layers are peeled off from the first glass substrate 30 by etching or laser irradiation, and the first etch stopper layer 12 is attached to the substrate 10 by the adhesive layer 11. Also, the overlying thin film layers are peeled off from the second glass substrate 35 by etching or laser irradiation, and the second etch stopper layer 22 is attached to the polarization plate 23. As shown in FIG. 4, a cover window 25 may be attached to the polarization plate 23 by an adhesive layer 24. The cover window may be made from a film substrate or a glass substrate. In the flexible display process, the glass substrate 35 may be used as the cover window, as shown in FIG. 3e, by leaving the second glass substrate 35 as it is without removing it until the process (see FIG. 3d) of removing the first glass substrate 30 and attaching the thin film layers to the film substrate is complete. In this case, the polarization plate 23 may be attached onto the second glass substrate 35.

Figure 5:
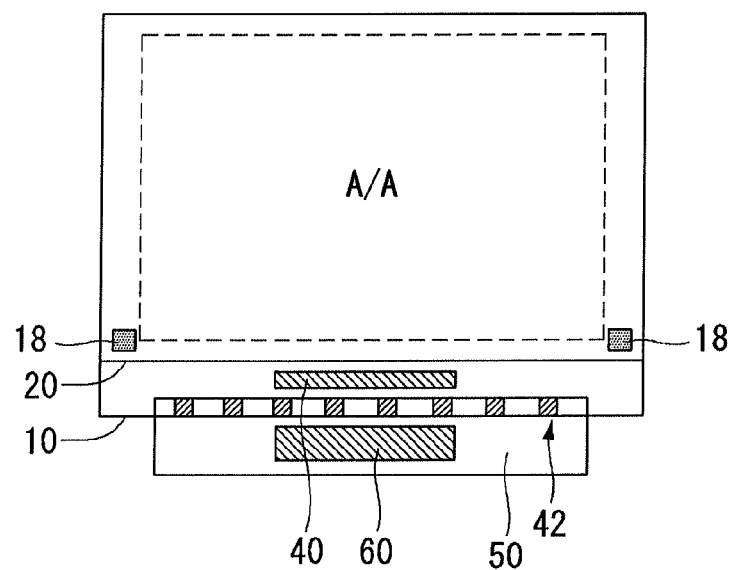

FIGS. 4 and 5 are a side view and a top plan view showing a drive IC in the display device of the present invention.

Referring to FIGS. 4 and 5, a drive IC 40 may be mounted on the substrate 10 of the pixel array. A flexible circuit board 50 such as a flexible printed circuit FPC may be attached to the substrate 10. A control IC 60 may be mounted on the flexible circuit board 50. In FIG. 5, 'A/A' denotes an active area of the pixel array where an input image is displayed.

The drive IC 40 comprises a display drive circuit that generates driving signals such as data signals and scan signals required to drive the TFT array 14 and the OLED array 15. In addition, the drive IC 40 comprises a touch screen drive circuit that supplies a driving signal to the lines of the touch screen and receives a touch sensor signal and converts it into touch raw data, which is digital data. The control IC 60 transmits digital video data of an input image and a timing signal to the drive IC 400, analyzes the touch raw data input from the drive IC 400, and outputs coordinate information of a touch input position.

One side of the flexible circuit board 50 is attached onto the substrate 10 of the pixel array substrate 100 by an anisotropic conductive film ACF. The other side of the flexible circuit board 50 may be connected to a printed circuit board (not shown) PCB by a connector. The flexible circuit board 50 may be folded back over the substrate 10 of the pixel array substrate 100.

Figure 6:
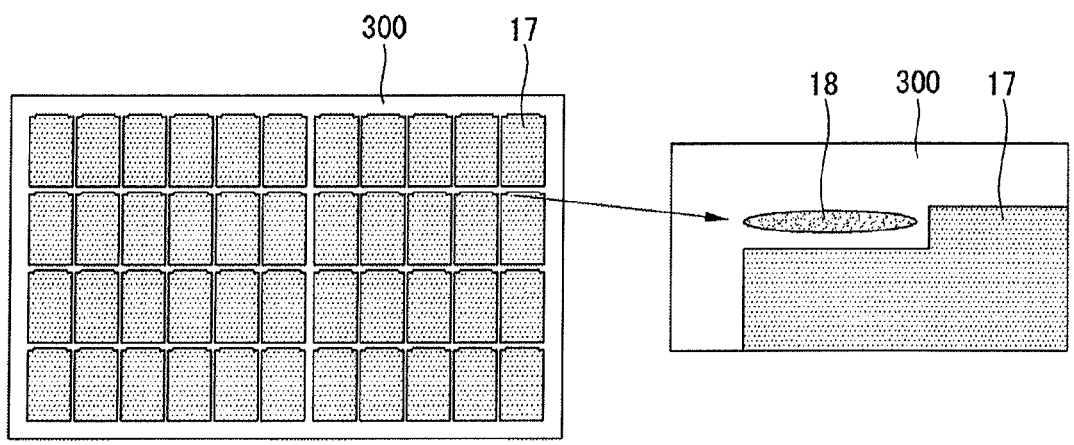
FIGS. 6 and 7 are a top plan view and a cross-sectional view showing a mother substrate where a plurality of cells are simultaneously formed.
Figure 7:
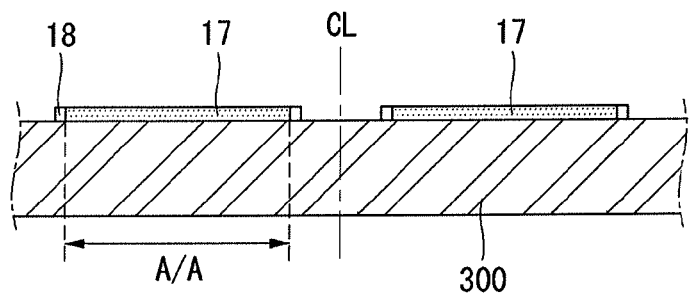

FIGS. 6 and 7 are a top plan view and a cross-sectional view showing a mother substrate where a plurality of cells are simultaneously formed.

Referring to FIG. 6, in the bonding process, an adhesive film 17 and a conductive sealant 18 are applied to a mother substrate 300 of an upper or lower plate to attach an upper plate and a lower plate.

A plurality of cells are simultaneously formed on the mother substrate 300. The mother substrate 300 is cut along a cutting line and divided into cell-sized pieces. Cell is a unit of size for a single display panel. Each cell has a structure of a pixel array substrate 100 and a touch screen substrate 200 bonded together by the adhesive film 17 and the conductive sealant 18.

The adhesive film 17 is cut to a size that covers the TFT array 14 and the OLED array 15, and attached onto the mother substrate so as to cover the arrays 14 and 15.

The adhesive film 17 is cut into cell-sized pieces, and corners of the cell-sized pieces are recessed so as not to cover the conductive sealant 18. The conductive sealant 18 may be applied onto the upper pads PADU of the touch screen substrate 200 formed on the mother substrate 300. If the mother substrate is a mother substrate for the pixel array substrate, the conductive sealant 18 is applied onto lower pads of the pixel array substrate 100.

Figure 8:
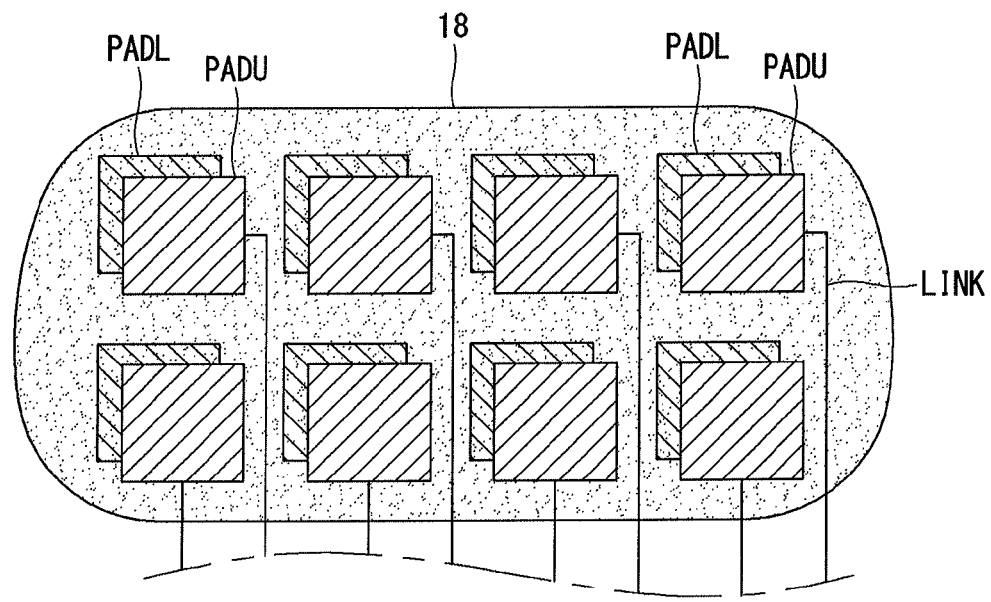
FIG. 8 is a view showing an ideal example of application of conductive sealant between upper pads and lower pads.

FIG. 8 is a view showing an ideal example of application of conductive sealant 18 between upper pads PADU and lower pads PADL.

Referring to FIG. 8, the conductive sealant 18 is applied onto the mother substrate 300 in liquid state and hardened by UV rays or heat. In order to electrically connect the upper pads PADU and lower pads PADL, the conductive sealant 18 should be placed between the upper pads PADU and the lower pads PADL.

Figure 9:
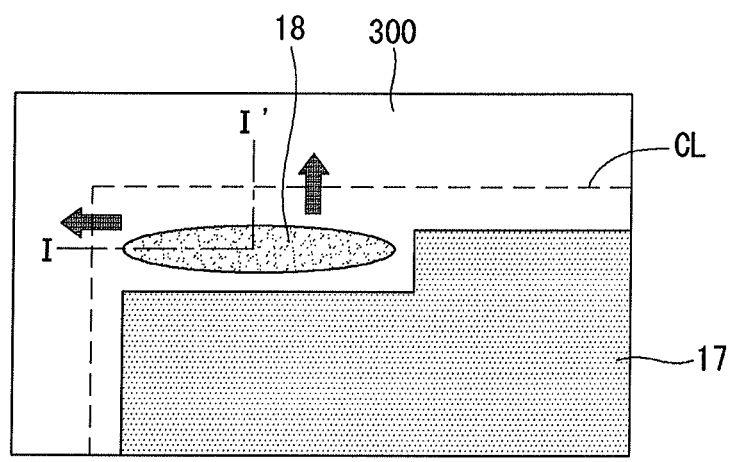
FIG. 9 is a partial enlarged view of a conductive sealant and an adhesive film and a cross-sectional view of an upper plate taken along line I-I'.
Figure 9:
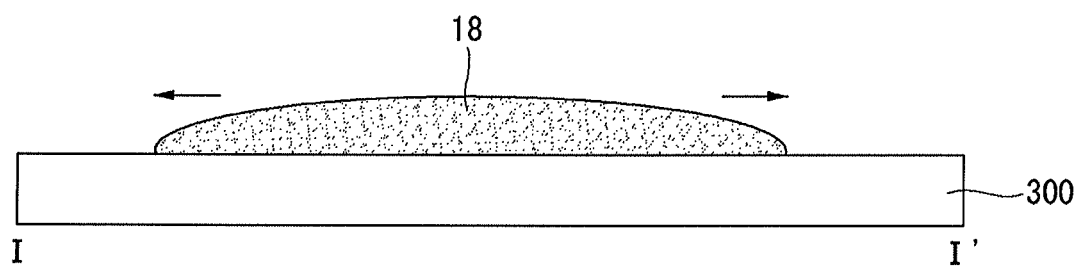
Figure 10:
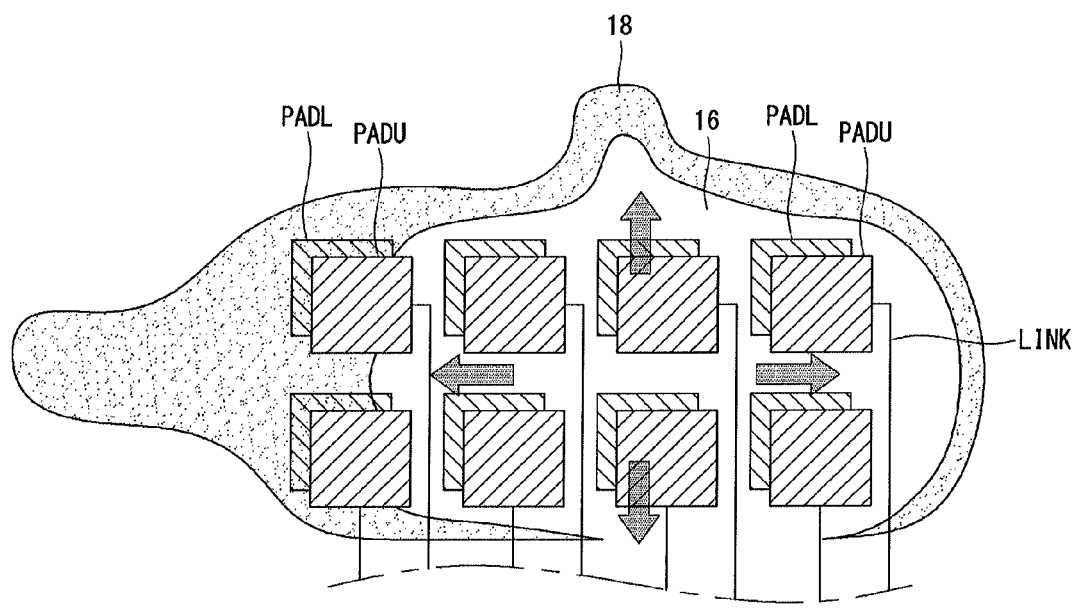
FIG. 10 is a view showing an example of poor application of a conductive sealant caused by scattering.

FIG. 9 is a partial enlarged view of the conductive sealant 18 and the adhesive film 17 and a cross-sectional view of the upper plate taken along line I-I'. FIG. 10 is a view showing an example of poor application of the conductive sealant caused by scattering due to a large pressure difference between the inside and outside of the display panel.

Referring to FIGS. 9 and 10, if the conductive sealant 18 spreads or is scattered out, the conductive sealant 18 between the upper pads PADU and the lower pads PADL may be partially lost. This creates a space 16 with no conductive sealant 18 between the upper pads PADU and the lower pads PADL, and hence the upper pads PADU cannot be electrically connected to the lower pads PADL, bringing about a bad contact. Especially, when the bonding process is performed in a vacuum chamber, the conductive sealant may be scattered due to a large pressure difference between the inside and outside of the display panel, resulting in a bad contact between the pads. In FIG. 10, 'LINK' denotes link lines that connect the upper pads PADU and the TSP lines.

In the present invention, as shown in FIGS. 11 and 12, the adhesive film 17 is cut into a structure that partially or entirely surrounds the conductive sealant 18, in order to prevent scattering of the conductive sealant 18.

FIG. 11 is a partial enlarged view of a conductive sealant and an adhesive film and a cross-sectional view of an upper plate taken along line FIG. 12 is a view showing various modifications of extension portions 17a and 17b of the adhesive film 17.

Referring to FIGS. 11 and 12, an opening 70 exposing the conductive sealant 18 is formed at a corner of the adhesive film 17.

The adhesive film 17 comprises first and second extension portions 17a and 17b that surround the opening 70 so as to prevent the conductive sealant 18 from being scattered out.

The first extension portion 17a extends along the left or right sides of the adhesive film 17 and defines one edge of the opening 70. The second extension portion 17b extends along the top or bottom side of the adhesive film 17 and defines the other edge of the opening 70.

The first and second extension portions 17a and 17b serve as a dam that reduces the pressure difference between the surroundings of the conductive sealant 18 and the outside of the display panel and prevents the conductive sealant 18 from spreading during the bonding process. Accordingly, the first and second extension portions 17a and 17b can minimize bad contacts between the upper pads PADU and lower pads PADL by preventing the conductive sealant 18 from spreading or being scattered during the bonding process.

The first and second extension portions 17a and 17b may be modified in various ways as shown in FIG. 12. For instance, any one of the first and second extension portions 17a and 17b may be omitted. The first and second extension portions 17a and 17b are connected to or disconnected from the main body of the adhesive film 17.

As stated above, in the present invention, the adhesive film is cut so that the opening with the conductive sealant applied to it is surrounded by the extension portions of the adhesive film. As a result, the present invention can prevent a bad contact between upper pads and the lower pads when bonding a touch screen substrate and a pixel array substrate.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a pixel array substrate comprising an active area on which an input image is displayed and first pads outside the active area;
   a touch screen substrate comprising second pads;
   a non-conductive adhesive film that is extended from the active area to outside the active area and attaches the pixel array substrate and the touch screen substrate; the non-conductive adhesive film having an opening in a portion thereof outside the active area exposing opposing first and second pads, and, an extension portion of the non-conductive adhesive film surrounds at least a portion of the opening; and
   a conductive sealant disposed in the opening electrically connects the first pads and the second pads.

2. The display device of claim 1, wherein the extension portion extends along left and right sides of the adhesive film and defines the opening.

3. The display device of claim 2, wherein one or more of the first and second extension portions are connected to the adhesive film.

4. The display device of claim 3, wherein the pixel array substrate comprises thin film transistors and organic light emitting diodes.

5. The display device of claim 2, wherein one or more of the first and second extension portions are disconnected from the adhesive film.

6. The display device of claim 5, wherein the pixel array substrate comprises thin film transistors and organic light emitting diodes.

7. The display device of claim 1, wherein the extension portion extends along a top or a bottom side of the adhesive film and defines one edge of the opening.

8. The display device of claim 1, wherein the extension portion comprises:
   a first extension portion that extends along the left and right sides of the adhesive film and defines the opening; and
   a second extension portion that extends along the top or bottom side of the adhesive film and defines the other edge of the opening.

* * * * *